(12) United States Patent
Hara et al.

(10) Patent No.: US 11,789,567 B2
(45) Date of Patent: Oct. 17, 2023

(54) DETECTION APPARATUS, DETECTION METHOD, AND SPATIAL PROJECTION APPARATUS

(71) Applicant: CASIO COMPUTER CO., LTD., Tokyo (JP)

(72) Inventors: Shunsuke Hara, Fuchu (JP); Tetsuro Narikawa, Hamura (JP); Kazuyasu Fukano, Tokyo (JP); Masaki Kobayashi, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/700,743

(22) Filed: Mar. 22, 2022

(65) Prior Publication Data

US 2022/0308695 A1    Sep. 29, 2022

(30) Foreign Application Priority Data

Mar. 23, 2021    (JP) .................. 2021-048435

(51) Int. Cl.
*G06F 3/042* (2006.01)
*G06F 3/01* (2006.01)
*H04N 9/31* (2006.01)
*G01S 17/42* (2006.01)
*G02B 27/14* (2006.01)
*G06F 3/16* (2006.01)

(52) U.S. Cl.
CPC ............ *G06F 3/0421* (2013.01); *G01S 17/42* (2013.01); *G06F 3/011* (2013.01); *H04N 9/317* (2013.01); *G02B 27/14* (2013.01); *G06F 3/016* (2013.01); *G06F 3/16* (2013.01)

(58) Field of Classification Search
None
See application file for complete search history.

(56) References Cited

U.S. PATENT DOCUMENTS

| | | | |
|---|---|---|---|
| 2015/0077399 A1* | 3/2015 | Nishioka | G06F 3/04815 345/175 |
| 2015/0109257 A1* | 4/2015 | Jalali | G06F 3/0488 345/175 |
| 2017/0329458 A1* | 11/2017 | Kanemaru | G06V 10/145 |
| 2020/0218354 A1* | 7/2020 | Beattie | G06T 7/41 |

FOREIGN PATENT DOCUMENTS

| | | |
|---|---|---|
| JP | 2005-141102 A | 6/2005 |
| JP | 2019-003332 A | 1/2019 |

* cited by examiner

*Primary Examiner* — Christopher J Kohlman
(74) *Attorney, Agent, or Firm* — SCULLY SCOTT MURPHY & PRESSER, PC (57) ABSTRACT

A detection apparatus includes at least one processing unit, a light guide optical system configured to focus projected light to a spatial image forming plane to form an image thereon, and a sensor configured to shine a laser beam over a set scanning range to detect an entry depth of a target object in a direction orthogonal to the spatial image forming plane and an entry position of the target object on the spatial image forming plane, and the processing unit executes an operation associated with the entry position when the entry depth of the target object reaches a set depth. A display mode of a pointer image is displayed as superimposed on the spatial image forming plane is caused to change step by step in accordance with the entry depth of the target object in a direction orthogonal to the image forming plane which is detected by the sensor.

17 Claims, 7 Drawing Sheets

DETECTION APPARATUS, DETECTION METHOD, AND SPATIAL PROJECTION APPARATUS

CROSS-REFERENCE TO RELATED APPLICATION

This patent application is based upon and claims the benefit of priority under 35 USC 119 from Japanese Patent Application No. 2021-048435 filed on Mar. 23, 2021, the entire disclosure of which, including the specifications, claims, drawings and abstract, is incorporated herein by reference.

BACKGROUND OF THE INVENTION

Field of the Invention

The present invention relates to a detection apparatus, a detection method, and a spatial projection apparatus.

Description of the Related Art

There have conventionally been disclosed techniques for detecting operations performed on a spatial projected image. For example, Japanese Patent Laid-Open No. 2005-141102 (JP-A-2005-141102) describes a stereoscopic two-dimensional image display apparatus which includes a three-dimensional position detection sensor which is disposed in association with a spatial stereoscopic image display plane and configured to output a signal associated with to a position on which a physical operation is performed from the outside and a speaker configured to output voice or sound. In the three-dimensional position detection sensor, a light emitting module and a light receiving module of an X-direction detection line sensor are provided in such a manner as to face each other, and a light emitting module and a light receiving module of a Y-direction detection line sensor are provided in such a manner as to face each other on four sides of a quadrangular frame which defines a detection plane. Additionally, in the three-dimensional position detection sensor, such X-direction detection line sensors and Y-direction detection line sensors are provided in multiple layers in a Z-direction, that is, a depth direction to thereby enable a detection of a three-dimensional position of a detection target object.

SUMMARY OF THE INVENTION

According to an aspect of the present invention, there is provided a detection apparatus including at least one processing unit, a light guide optical system configured to cause projected light to focus on a spatial image forming plane to form an image thereon, and a sensor configured to shine a laser beam over a set scanning range to detect an entry depth of a target object in a direction orthogonal to the spatial image forming plane and an entry position of the target object on the spatial image forming plane, wherein the processing unit executes an operation associated with the entry position when the entry depth of the target object reaches a set depth, and wherein the processing unit controls the light guide optical system so that a display mode of a pointer image which is displayed as being superimposed on the spatial image forming plane is caused to change step by step in accordance with the entry depth of the target object in a direction orthogonal to the image forming plane which is detected by the sensor.

According to another aspect of the present invention, there is provided a detection method including causing projected light to focus on a spatial image forming plane to form an image thereon using a light guide optical system, shining a laser beam over a set scanning range to detect an entry depth of a target object in a direction orthogonal to the spatial image forming plane and an entry position of the target object on the spatial image forming plane using a sensor, and executing an operation associated with the entry position using a processing unit when the entry depth of the target object reaches a set depth, wherein the processing unit controls the light guide optical system so that a display mode of a pointer image which is displayed as being superimposed on the spatial image forming plane is caused to change step by step in accordance with the entry depth of the target object in a direction orthogonal to the image forming plane which is detected by the sensor.

According to a further aspect of the present invention, there is provided a spatial projection apparatus including at least one processing unit, a light guide optical system configured to cause projected light to focus on a spatial image forming plane to form an image thereon, and a sensor configured to shine a laser beam over a set scanning range to detect an entry depth of a target object in a direction orthogonal to the spatial image forming plane and an entry position of the target object on the spatial image forming plane, wherein the processing unit executes an operation associated with the entry position when the entry depth of the target object reaches a set depth, and wherein the processing unit controls the light guide optical system so that a display mode of a pointer image which is displayed as being superimposed on the spatial image forming plane is caused to change step by step in accordance with the entry depth of the target object in a direction orthogonal to the image forming plane which is detected by the sensor.

DETAILED DESCRIPTION OF THE PREFERRED EMBODIMENT

Figure 1:
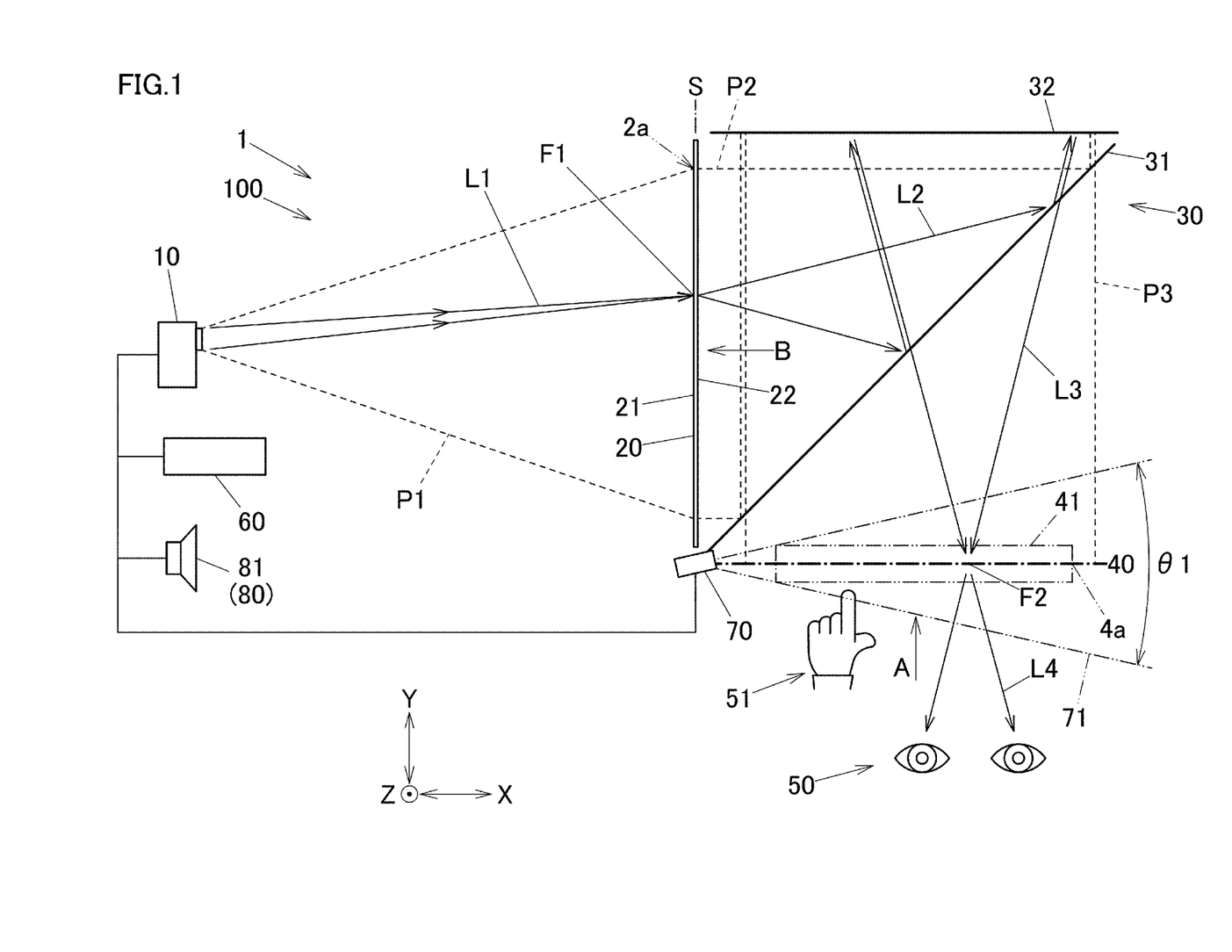
FIG. 1 is a schematic plan view of a spatial projection apparatus according to an embodiment of the present invention.

Hereinafter, an embodiment of the present invention will be described. FIG. 1 is a schematic plan view of a spatial projection apparatus 100 of a spatial projection system 1. The spatial projection apparatus 100 includes a projector 10, an image forming member 20 on which projected light P1 emitted from the projector 10 is shined, a light guide optical system 30 configured to guide the light projected on the image forming member 20, and a mid-air or aerial space image forming region 40 on which the light guided by the light guide optical system 30 is refocused to form an image. In addition, the spatial projection system 100 includes a processor 60, a ToF (Time of Flight) sensor 70 or a LiDAR (Light Detection And Ranging) sensor 70 or a LiDAR 70, and a speaker 81, which constitutes an output unit 80. These constituent elements are connected together in a wired or wireless fashion. In the spatial projection apparatus 100, a projected image 2a, which is formed on the image forming member 20 by light emitted from the projector 10, is diffuse transmitted through the image forming member 20 and is then incident on the light guide optical system 30. Then, the projected image 2a is refocused to be reimaged on the spatial image forming region 40 by the light guide optical system 30, whereby a spatial projected image 4a, which appears floating in a mid-air or aerial space, can be visualized by a viewer 50. In addition, the spatial projection apparatus 100 can execute various responding operations by detecting input operations performed on the spatial projected image 4a by a finger 51 or the like.

Figure 2:
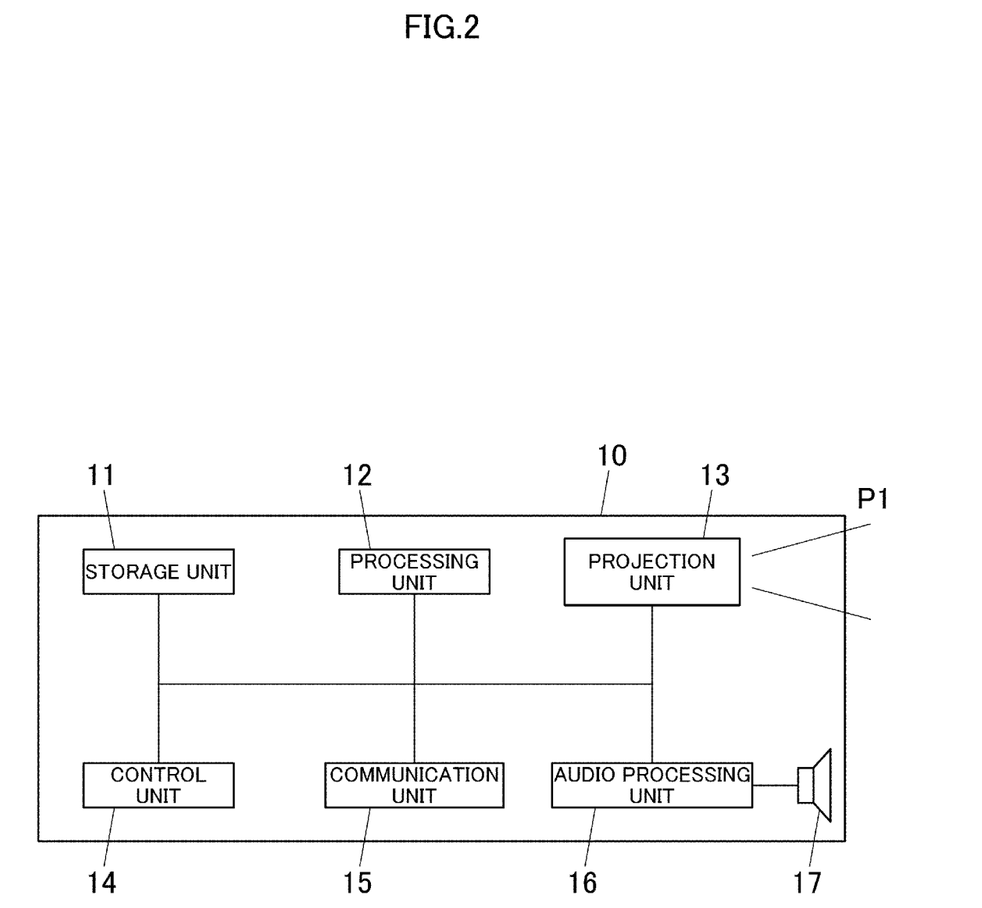
FIG. 2 is a block diagram showing a configuration of a projector according to the embodiment of the present invention.

Firstly, the configuration of the projector 10 will be described by reference to FIG. 2. The projector 10 includes a storage unit 11, a processing unit 12, a projection unit 13, a control unit 14, a communication unit 15, and an audio processing unit 16, and these constituent elements are connected to one another via internal buses. The storage unit 11 is made up, for example, of a solid state drive (SSD) and a static random access memory (SRAM). The storage unit 11 stores data such as image data, video image data, a control program, and the like which are not shown. The processing unit 12 is made up of CPU, a microcomputer, or the like and reads out the control program stored in the storage unit 11 so as to control the projector 10.

The projection unit 13 forms an image at a frame rate which comply with a preset image format based on image data sent from the processing unit 12 and emits the image so formed as projected light P1 to the outside of the projector 10. The projector 10 of the present embodiment is a projector of a digital light processing (DLP) type. In the projection unit 13, for example, light in the blue wavelength range, light in the green wavelength range, and light in the red wavelength range are emitted from an internal light source apparatus and are then shined onto a digital micromirror device (DMD). Then, micromirror lenses (or pixels) of this DMD reflect individually the light in the blue wavelength range, the light in the green wavelength range, and the light in the red wavelength range in a time sharing fashion, whereby color image light can be produced. The image light is emitted as projected light P1 of the projector 10 to the outside thereof via a projection lens inside the projection unit 13. The projected light P1 (image light) emitted from the projection unit 13 is projected onto the image forming member 20 shown in FIG. 1.

The control unit 14 receives a control signal from a control key or the like which is provided on a casing of the projector 10 and transmits the control signal so received to the processing unit 12 via the buses. The processing unit 12 executes various functions such as a projection processing operation or the like in accordance with a control signal received from the control unit 14.

The communication unit 15 receives a control signal in the form of an infrared modulation signal or the like which is transmitted thereto from a remote controller, not shown, and then transmits the control signal so received to the processing unit 12. The communication unit 15 is connected with external devices such as the processor 60, the output unit 80, the LiDAR sensor 70, and the like.

The audio processing unit 16 includes a circuitry for a sound source such as a pulse code modulation (PCM) sound source or the like and drives a speaker 17 to diffuse and emit sound or voice loudly therefrom. In the case that an audio signal is included in image data which is projected, the audio processing unit 16 converts the audio signal into an analog signal when projecting the image data so as to output voice or sound corresponding to the audio signal loudly through the speaker 17.

Returning to FIG. 1, the image forming member 20 has an arbitrary shape and size which can substantially encompass a projection range of the projected light P1. Alternatively, the image forming member 20 is disposed in an arbitrary position which includes the projection range of the projected light P1. The image forming member 20 in the present embodiment is configured as a flat plate-like or film-like light transmitting screen. The image forming member 20 is a light transmitting member in which when the projected light P1 (including light L1) emitted from the projector 10 is shined on a first surface 21, which faces the projector 10, of the image forming member 20, spatial projected light P2 (also including light L2) is diffuse emitted from a second surface 22, which is opposite to the first surface 21, towards the light guide optical system 30.

The light guide optical system 30 is provided on a side of the image forming member 20 on which the second surface 22 is provided and includes a beam splitter 31 and a retro-reflection member 32 (a retro-reflection mirror). The retro-reflection member 32 is disposed so as to be at right angles to a disposition plane S (a plane including the Y-direction (the front-rear direction) and the Z-direction (an up-down direction) in FIG. 1) of the image forming member 20. The beam splitter 31 is formed into a flat plate-like shape and is disposed so as to be inclined at an angle of 45 degrees with respect to the disposition plane S of the image forming member 20 and the retro-reflection member 32. The beam splitter 31 of the present embodiment is a half mirror configured to reflect a part of light incident thereon and to transmit therethrough a part of the remainder of the light. The retro-reflection member 32 has a mirror surface which reflects light incident thereon in an opposite direction which is opposite to an incident direction.

The spatial image forming region 40 constitutes a spatial region on which the spatial projected image 4a is displayed as a result of the projected image 2a projected onto the image forming member 20 being emitted therefrom as spatial projected light P2 (P3) and the spatial projected light P2 (P3) so emitted being thereafter refocused on the spatial image forming region 40 by the light guide optical system 30.

The processor 60 can be made up of a personal computer, a smartphone, PDA, and the like. The processor 60 can transmit image data (including a video image and a still image) and audio data which are stored in an internal or external storage unit (not shown) to the projector 10. The processor 60 may transmit audio data to the speaker 81 which is provided outside the projector 10. For example, an external storage device, which is connected by way of LAN or WAN, can be used as the external storage unit. The processor 60 detects an input from the LiDAR sensor 70 and controls the operations of the projector 10 and the output unit 80.

The LiDAR sensor 70 has a light projection module configured to emit (project) light, which is a laser beam, and a light reception module configured to receive light which is emitted by the light projection unit and is then reflected by a detection target object. The processor 60 calculates a distance from the LiDAR sensor 70 to a detection target object by measuring a time required from a point in time when the LiDAR sensor 70 emits pulse-shaped light in the red wavelength range from the light projection module until a point in time when the LiDAR sensor 70 receives the pulse-shaped light in the red wavelength range which is reflected by the detection target object at the light reception module (specifically speaking, a phase difference between the emitted light and the received light). Ultraviolet rays, visible rays, near infrared rays, and the like can be used as the light which the LiDAR sensor 70 emits.

Figure 3:
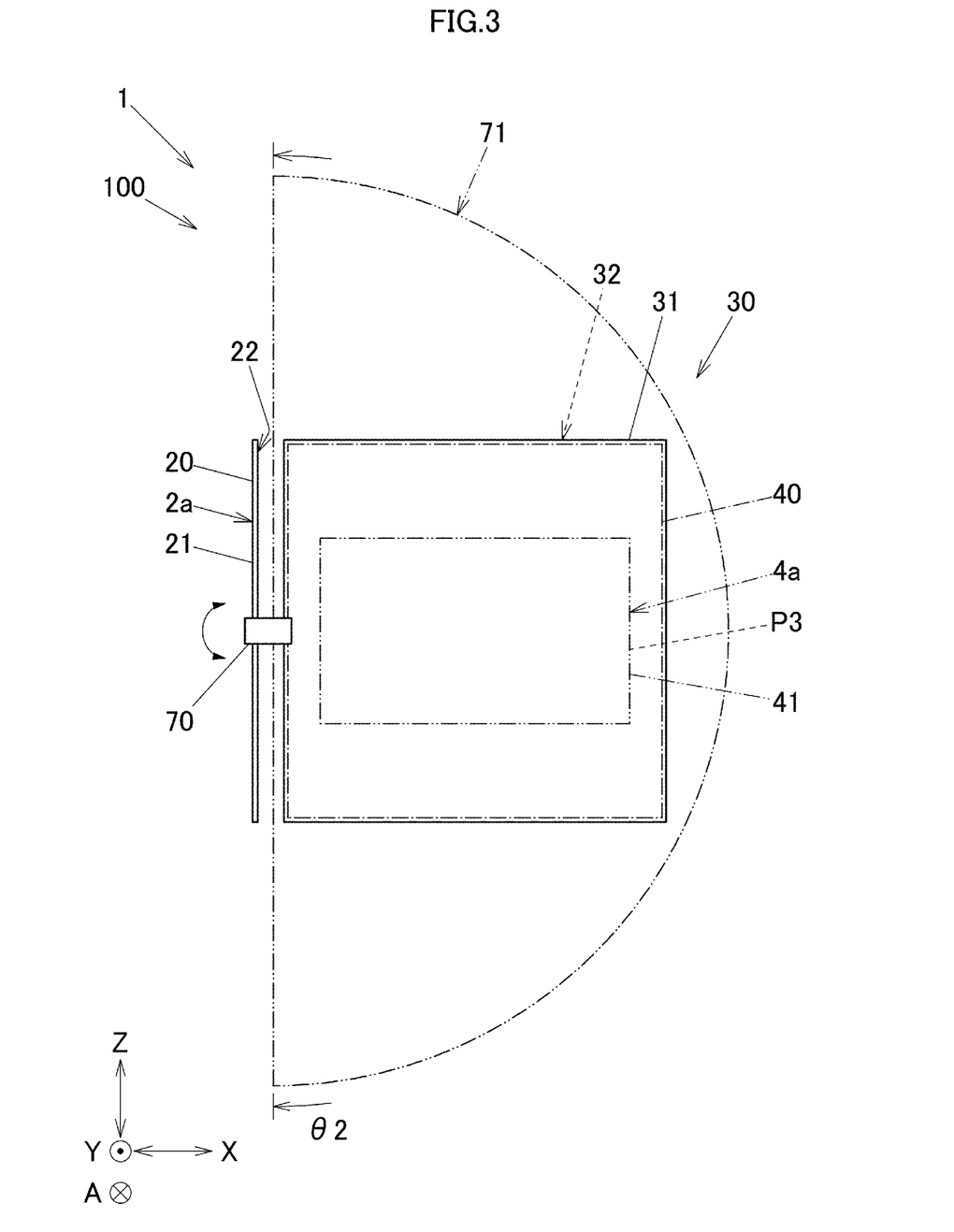
FIG. 3 is a schematic front view of the spatial projection apparatus according to the embodiment of the present invention.

The LiDAR sensor 70 of the present embodiment is disposed at a side (a left side as viewed from the viewer 50) of the spatial image forming region 40 and in a position lying within a vertical range of the spatial image forming region 40 in the up-down direction (in the Z-direction) thereof (refer to FIGS. 1 and 3). The LiDAR sensor 70 emits light from the light projection module and receives the light shined onto and reflected by a detection target object at the light reception module while rotating over a predetermined scanning range 71 in such a manner as to reciprocate or oscillate over an angular range θ1 (refer to FIG. 1) around an axis in the Z-direction and an angular range θ2 (refer to FIG. 3) around an axis in the Y-direction. The processor 60 can detect a distance from the LiDAR sensor 70 to the finger 51 through projection and reception of the light. Additionally, the processor 60 can detect a position of the finger 51 in an aerial space from the distance to the finger 51 and the directions in which the LiDAR sensor 70 scans (a solid angle).

Figure 4:
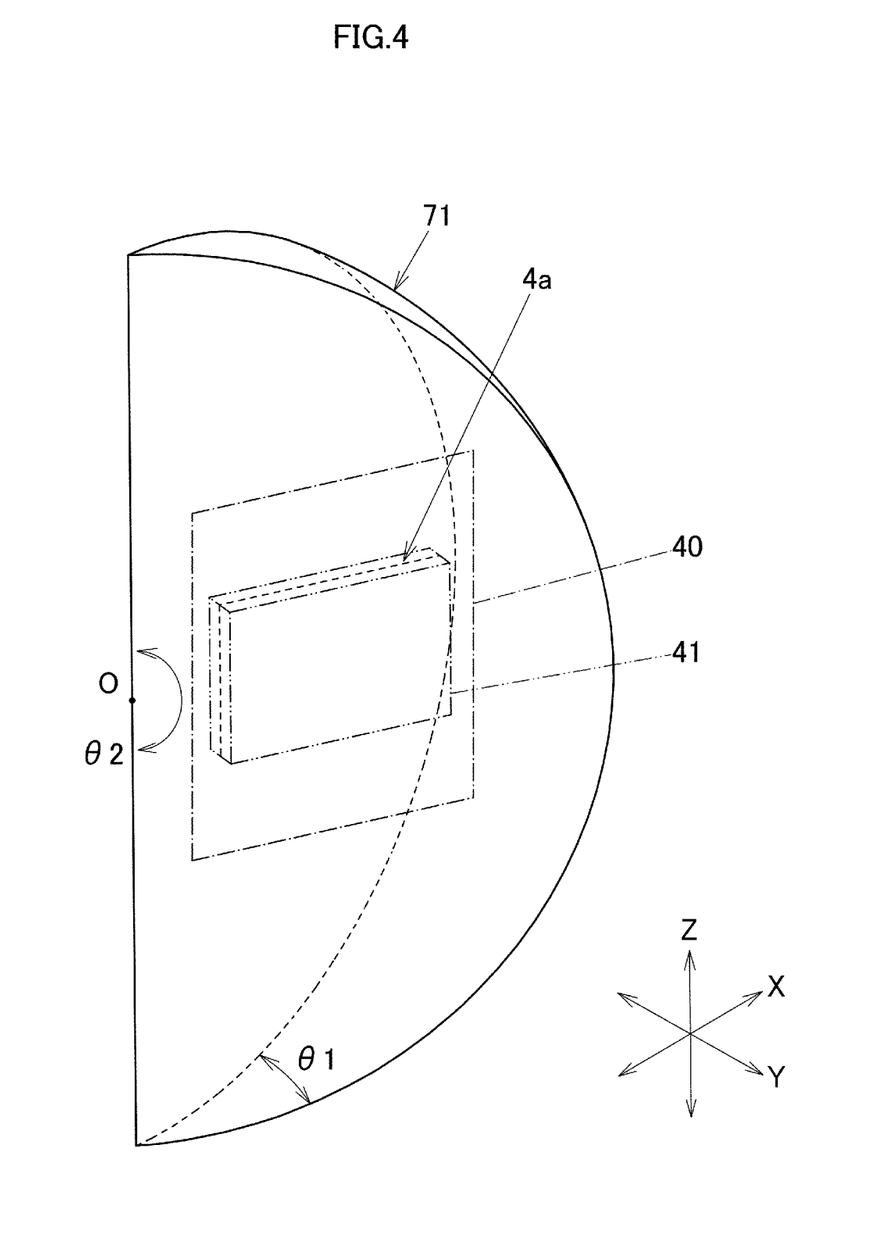
FIG. 4 is a perspective view showing a relationship between a scanning range of a LiDAR sensor and a detection target region according to the embodiment of the present invention.

The spatial projection apparatus 100 is configured so that the scanning range 71 of the LiDAR sensor 70 includes a detection target region 41, which is a spatial region of the spatial projected image 4a which expands in the front-rear direction (the Y-direction) as viewed from the viewer 50. FIG. 4 is a perspective view showing a positional relationship between the scanning range 71 and the detection target region 41, and the scanning range 71 is set to the angular ranges θ1, θ2 around an origin 0 where the LiDAR sensor 70 is disposed. In the present embodiment, the detection target region 41 is made up of a space of a rectangular thick plate-like shape. Although a flat plane region (a region on a ZX plane) of the detection target region 41 as viewed from the viewer 50 is shown as coinciding with a display range of the spatial projected image 4a in the present embodiment, the flat plane region may be set narrower or wider than the display range of the spatial projected image 4a. That is, the detection target region 41 can be set so as to include a part or a whole of the spatial projected image 4a. Although a range of the detection target region 41 in a depth direction (the Y-direction) as viewed from the viewer 50 is shown as including a near side and a far side of the spatial projected image 4a in the present embodiment, the relevant range may be set so as to include only the near side or the far side of the spatial projected image 4a. In this way, the LiDAR sensor 70 is configured so as to detect a stereoscopic spatial position of the detection target object in the detection target region 41 by scanning the spaces defined as described above while rotating around the two axes. The spatial projection apparatus 100 can execute an arbitrary responding operation in accordance with a position where the detection target object such as the finger 51 or the like is detected in the detection target region 41. As a result, the detection target region 41 also functions as an operation target region where an input operation can be performed on the spatial projected image 4a.

The speaker 81 (the output unit 80) is provided as an external speaker of the projector 10 or the processor 60. In the present embodiment, the speaker 81 can reproduce voice or sound by, for example, associating an audio signal output from the communication unit 15 in accordance with a projection control of the projector 10 with the projection control. Additionally, the speaker 81 may reproduce audio data directly output from the processor 60.

Next, a spatial projection method and a detection target object detection method in the spatial projection apparatus 100 (the spatial projection system 1) will be described. Light L1 emitted from a point light source (an arbitrary point on the micromirror of DMD (the display device) within the projector 10 (within the projection unit 13) by way of the projection lens focuses at an image forming point F1 on the image forming member 20 to thereby form an image thereat. Lights are shined over a shining range of projected light P1 on the image forming member 20 as the light L1 is done and focus to form corresponding images thereon, whereby a projected image 2a is projected on the image forming member 20.

Light at an arbitrary point which makes up the projected image 2a formed on the image forming member 20 is diffuse transmitted through the image forming member 20 at a predetermined diffuse angle and is emitted from the second surface 22. For example, the light L1 which focuses at the image forming point F1 to form an image thereat is diffused at the predetermined diffuse angle to be incident on the beam splitter 31 as light L2. A part of the light L2 is reflected towards the retro-reflection member 32 by the beam splitter 31. That is, the light L2 emitted from the point light source of the projected image 2a is guided as diffuse light along an optical path from the image forming member 20 to the retro-reflection member 32. Since the retro-reflection member 32 reflects light incident thereon in the opposite direction which is opposite to the incident direction, the light L2 incident on the retro-reflection member 32 is reflected towards the beam splitter 31 as converging light which converges at the same angle as the diffuse angle. Light L3 reflected on the retro-reflection member 32 is partially transmitted through the beam splitter 31 and is guided towards the spatial image forming region 40. Then, the light L3 focuses at an image forming point F2 on the spatial image forming region 40 to form an image thereon. An optical path length of the light L2 is substantially the same as an optical path length of the light L3.

Then, the light L3 which focuses at the image forming point F2 on the spatial image forming region 40 to form the image thereon is guided as light L4 which has a diffuse angle which is similar to the converging angle of the light L3 and the diffuse angle of the light L2.

Thus, as has been described heretofore, the lights L1 to L4, which originate from the point light source on the display device within the projector 10, are guided over in effective regions of the optical paths of the image forming member 20 and the light guide optical system 30. That is, projected light P1 which is a set of lights L1 emitted from the point light sources of the projector 10 is shined on the image forming member 20 from the first surface 21 thereof to form an image on the image forming member 20. The projected light P1 shined on the image forming member 20 is emitted from the second surface 22 towards the beam splitter 31 as spatial projected light P2 which is a set of lights L2. A part of the spatial projected light P2 shined on the beam splitter 31 is reflected towards the retro-reflection member 32. The retro-reflection member 32 reflects the spatial projected light P2 guided from the beam splitter 31 as spatial projected light P3 (a set of lights L3). A part of the spatial projected light P3 which is reflected by the retro-reflection member 32 is transmitted through the beam splitter 31 and is then guided towards the spatial image forming region 40.

In this way, the light (the set of lights from the point light sources) making up the projected image 2a formed on the image forming member 20 is refocused on the spatial image forming region 40, which constitutes a spatial projection plane, to thereby form an image thereon and is then emitted towards the viewer 50. As a result, the viewer 50 can view a spatial projected image 4a which is formed in a mid-air space in the spatial image forming region 40. Even when the viewer 50 moves from one viewing point to another, the viewer 50 still can view the spatial projected image 4a. For example, light L4 which is emitted from the image forming point F2 can be visualized in positions which fall within a range of a diffuse angle (within a range of an emitting angle) of the light L4 shown in FIG. 1.

Orientations of the spatial projected image 4a in the up-down direction (the Z-direction) and the left-right direction (the X-direction) as viewed from a direction A which is a direction from the viewer 50 towards the spatial image forming region 40 are substantially the same as those of the projected image 2a in the up-down direction (the Z-direction) and the front-rear direction (the Y-direction) as viewed from a direction B. On the other hand, since the optical path lengths of the light L2 and the light L3 are substantially the same, a depth position of the spatial projected image 4a as viewed from the direction A becomes opposite to a depth position of the projected image 2a as viewed from the direction B. In the case that the image forming member 20 which is provided planar is used, the spatial projected image 4a is also displayed as a flat planar image.

The spatial projection apparatus 100 can detect an input operation such as a touching operation by an operator, who is the viewer 50 or the like, and execute a control corresponding to the input operation. For example, a button, a slide bar, an icon, or the like can be displayed as an operation target image. As a result, the spatial projection apparatus 100 also functions as a detection apparatus for detecting an operation performed on the spatial projected image 4a. When the operator moves the finger 51 towards the operation target image or the like which is displayed in the detection target region 41, the LiDAR sensor 70 can detect a position of the finger 51, whereby the processor 60 can get to know a portion on the spatial projected image 4a which is indicated by the finger 51 and a degree of depth at which the finger 51 enters into the relevant portion.

As this occurs, the processor 60 can determine step by step an entry depth (a push-in depth) of the finger 51 (a detection target object) in the detection target region 41 which is detected by the LiDAR sensor 70 and output a response in strength corresponding to the entry depth so determined. In the example shown in FIG. 1, the processor 60 outputs operation sound in a gradually increasing fashion from the speaker 81 as the entry depth of the finger 51 so increases. In addition, the processor 60 controls the speaker 81 so as to gradually output the operation sound from a loud state to a small state. Alternatively, the processor 60 can control so that the operation sound output from the speaker 81 increases or decreases in sound level as the entry depth of the finger 51 increases. Further, the processor 60 may control so that the tone of the operation sound output from the speaker 81 changes as the entry depth of the finger 51 increases.

Then, when the entry depth of the finger 51 reaches a predetermined depth, the processor 60 determines that an input operation is performed on the spatial projected image 4a and executes an arbitrary responding operation. As the responding operation, the processor 60 can, for example, change the details of display or setting of the spatial projected image 4a or output voice or sound from the speaker 81 (or the speaker 17).

In this way, the LiDAR sensor 70 detects the detection target object such as the finger 51 or the like in the detection target region 41 from the side of the spatial image forming region 40, and the operation sound corresponding to the entry depth of the detection target object is output from the output unit 80, whereby the operator can easily sense an extent by which the input operation performed on the spatial projected image 4a is recognized. As a result, the spatial projection apparatus 100 (the detection apparatus) can be provided which has a good operation feeling.

Next, Modified Examples 1 to 4 will be described which constitute other responding examples when the detection target object is detected in the detection target region 41. In the description of Modified Examples 1 to 4, like reference signs to those imparted to the configurations of the embodiment shown in FIGS. 1 to 4 will be imparted to configurations of Modified Examples 1 to 4 which are similar to those of the embodiment, and the description of the relevant configurations will be omitted or simplified.

Modified Example 1

Figure 5:
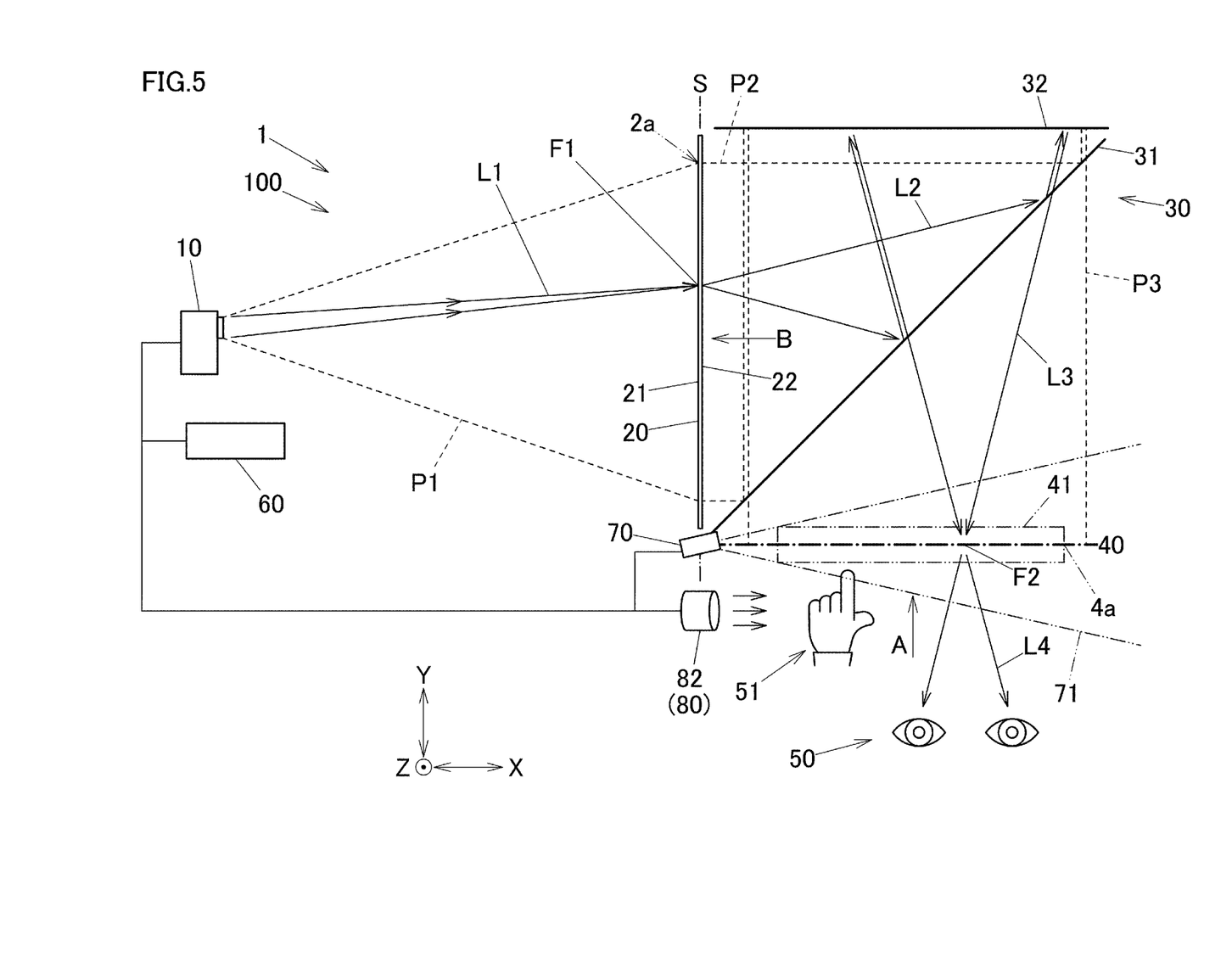
FIG. 5 is a schematic plan view of a spatial projection apparatus of Modified Example 1 according to the embodiment of the present invention.

FIG. 5 is a schematic plan view of a spatial projection apparatus 100 of Modified Example 1. In the spatial projection apparatus 100 of Modified Example 1, a blower machine 82 (a fan) is used as an output unit 80 in place of the speaker 81.

In the spatial projection apparatus 100 of Modified Example 1, a processor 60 can determine step by step an entry depth (a push-in depth) of a finger 51 (a detection target object) in a detection target region 41 which is detected by a LiDAR sensor 70 and cause the blower machine 82 to blow out air in strength corresponding to the entry depth so determined (a responding output). The processor 60 causes the blower machine 82 to blow out air in a gradually increasing fashion in strength as the entry depth of the finger 51 so increases. Alternatively, the processor 60 causes the blower machine 82 to blow out air in an increasing fashion in strength or in a decreasing fashion in strength as the entry depth of the finger 51 increases. The air blown out by the blower machine 82 may be aimed at a tip of the finger 51 or may be blown out in a predetermined width so as to be aimed at the whole of the finger 51. The blower machine 82 can be set in an arbitrary position, and hence, the setting position of the blower machine 82 is not limited to a side position to a spatial image forming region 40 as shown in FIG. 5. Thus, the blower machine 82 may be set so as to blow out air towards the finger 51 from a far side beyond the spatial image forming region 40 as viewed from an operator (a viewer 50). In addition, the processor 60 may causes the blower machine 82 to blow out air when the processor 60 determines that the finger 51 is positioned on a far side beyond a spatial projected image 4a. In this way, the operator can sense to recognize the execution of an input operation on the spatial projected image 4a by feeling the air touching the finger 51.

Modified Example 2

Figure 6A:
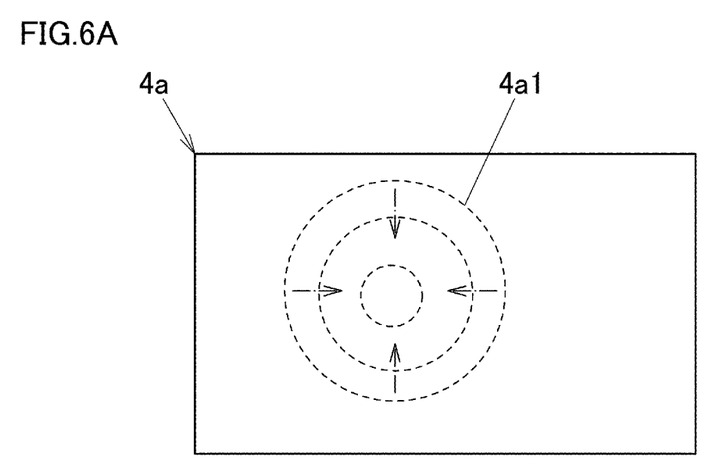
FIG. 6A is a schematic diagram showing a response output of a spatial projection apparatus of Modified Example 2 according to the embodiment of the present invention.

FIG. 6A is a schematic diagram showing a responding output by a spatial projection apparatus 100 according to Modified Example 2. In Modified Example 2, the processor 60 in FIG. 1 changes step by step a display mode of a pointer image 4a1 in a spatial image forming region 40 in accordance with an entry depth of a finger 51 (a detection target object) in a detection target region 41 (refer to FIG. 1) which is detected by a LiDAR sensor 70. As a result, a projection unit for projecting a spatial projected image 4a is applied as an output unit 80 for executing a responding output (this will also be applied to Modified Examples 3 and 4).

In FIG. 6A, the pointer image 4a has a circular shape. The processor 60 changes the size of the circular shape of the pointer image 4a in such a manner as to be reduced to converge on the position of a finger 51 (substantially at a center of the spatial projected image 4a in FIG. 6A) as the finger 51 enters deeper into the detection target region 41. Other images of icons such as a polygonal shape, an arrow, and the like can be used as the pointer image 4a1. Additionally, the shape of the pointer image 4a1 is not limited to a closed figure such as the circular pointer image 4a1, and hence, a partially opened figure (for example, a broken line, a chain line) may be used for the pointer image 4a1. The operator can determine that the input operation is recognized by the spatial projection apparatus 100 by visually confirming that the pointer image 4a1 has reduced its size.

Modified Example 3

Figure 6B:
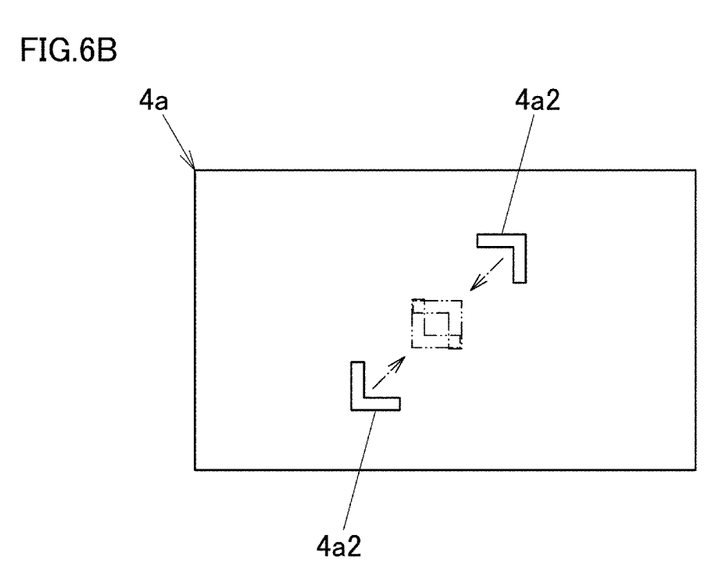
FIG. 6B is a schematic diagram showing a response output of a spatial projection apparatus of Modified Example 3 according to the embodiment of the present invention.

FIG. 6B is a schematic diagram showing a responding output by a spatial projection apparatus 100 according to Modified Example 3. In Modified Example 3, too, the processor 60 shown in FIG. 1 changes step by step a display mode of pointer images 4a2 in a spatial image forming region 40 in accordance with an entry depth of a finger 51 (a detection target object) in a detection target region 41 (refer to FIG. 1) which is detected by a LiDAR sensor 70.

The pointer images 4a2 in FIG. 6B are made up of two L-shaped figures which are disposed to face each other on inner corner sides thereof. The pointer images 4a2 are positioned at a top right portion and a bottom left portion as viewed from an operator. The processor 60 changes the display mode of the two pointer images 4a2 in such a manner that the pointer images 4a2 move towards each other to converge on the position of a finger 51 (substantially at a center of a spatial projected image 4a in FIG. 6B) as the finger 51 enters deeper into the detection target region 41. That is, the overall shape of the two pointer images 4a2 changes from a figure showing the two separate L-shaped figures to a figure showing a quadrangular shape formed by the two closed L-shaped figures. The operator can determine that the input operation is recognized by the spatial projection apparatus 100 by visually confirming that the two pointer images 4a2 are closed together to form the quadrangular shape.

Modified Example 4

Figure 7A:
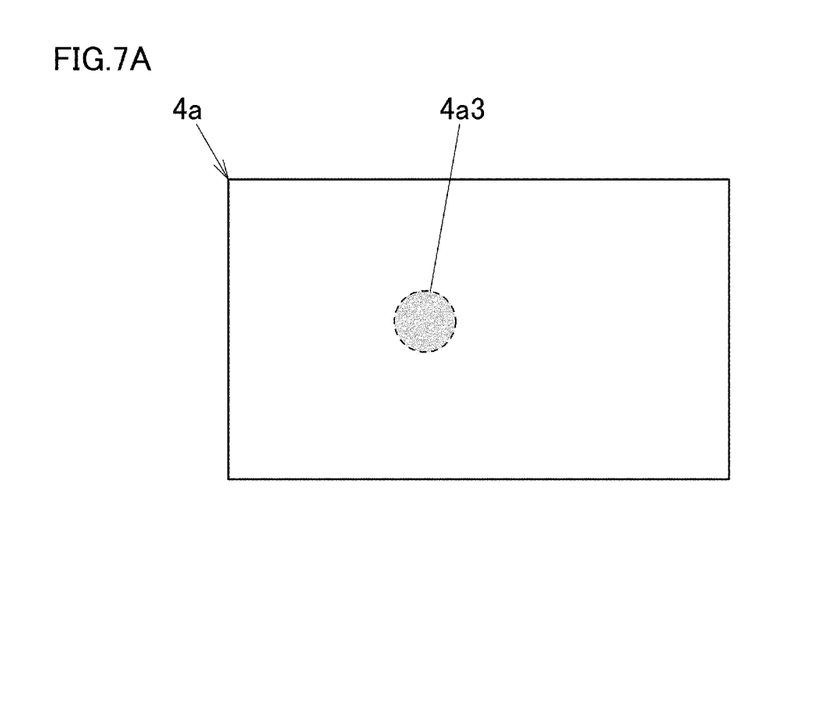
FIG. 7A is a schematic diagram showing a response output of a spatial projection apparatus of Modified Example 4 according to the embodiment of the present invention, in which a pointer image of Modified Example 4 is displayed in a spatial projected image.
Figure 7B:
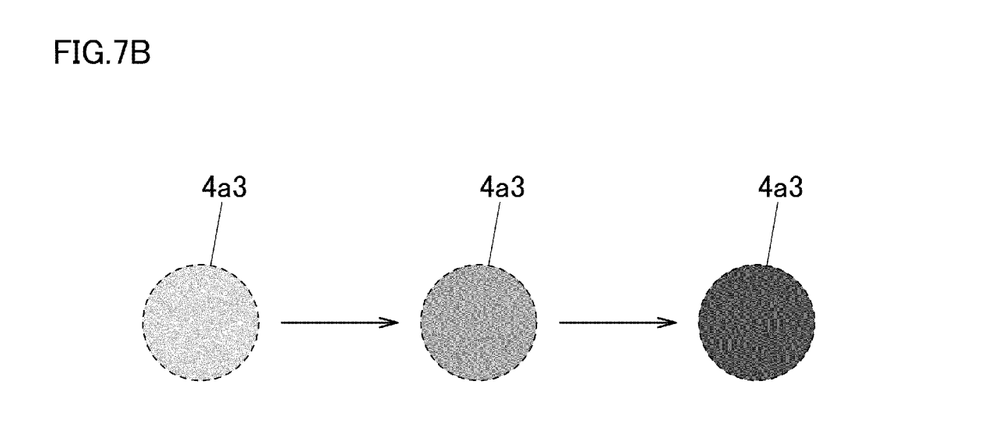
FIG. 7B is a schematic diagram showing a response output of the spatial projection apparatus of Modified Example 4 according to the embodiment of the present invention, in which a state is shown in which the color of the pointer image is changing.

FIGS. 7A and 7B are schematic diagrams showing a responding output by a spatial projection apparatus 100 according to Modified Example 4. In Modified Example 4, too, the processor 60 shown in FIG. 1 changes step by step a display mode of a pointer image 4a3 in a spatial image forming region 40 in accordance with an entry depth of a finger 51 in a detection target region 41 (refer to FIG. 1) which is detected by a LiDAR sensor 70.

The pointer image 4a3 in FIG. 7A has a circular shape. The processor 60 changes the display mode of the pointer image 4a3 in such a manner that a color of the pointer image 4a3 changes as the finger 51 enters deeper into the detection target region 41. For example, the display mode of the pointer image 4a3 changes in such a manner that the color of the pointer image 4a3 gets darker (a change shown in FIG. 7B) or brighter (a change opposite to the change shown in FIG. 7B) as the finger 51 enters deeper into the detection target region 41. In Modified Example 4, an operator can determine that the input operation is recognized by the spatial projection apparatus 100 by visually confirming the color of the pointer image 4a3.

Thus, while the responding output examples of Modified Examples 1 to 4 have been described heretofore, these configurations may be combined with the other configurations shown in FIG. 1. For example, the spatial projection apparatus 100 may include both the speaker 81 and the blower machine 82 as the output unit 80. Additionally, the pointer images 4a1 to 4a3 of Modified Examples 2 to 4 may be configured so that the display modes thereof are selected or combined in accordance with a scene, a position, or the like. For example, the display mode of the pointer image may be configured so that the color of the pointer image is changed as in the pointer image 4a3 while the size and display position of the pointer image are changed gradually as in the pointer image 4a1 and the pointer image 4a2.

Thus, as has been described heretofore, with the spatial projection apparatus 100 according to the present embodiment, the projected image 2a, which is to be projected as the spatial projected image 4a, is formed by the projector 10. As a result, the highly bright projected image 2a can be displayed when compared with a case in which a display image or a real thing is used as a projection target object, whereby the spatial projected image 4a can also be displayed highly brightly and clearly. In addition, with the projected image 2a projected by the projector 10, the size of the spatial projected image 4a can easily be enlarged by enlarging the shape of the image forming member 20 and providing an appropriate distance between the projector 10 and the image forming member 20.

The spatial projection apparatus 100 may include a light reflection member configured to reimage the point light sources formed on the image forming member 20 (for example, light from the image forming point F1) on the spatial image forming region 40 (for example, the image forming point F2 which is positioned planar symmetric with the image forming point F1 with respect to the beam splitter 31) in place of the beam splitter 31 and the retro-reflection member 32. For example, the light reflection member may be configured so that lights incident thereon at a predetermined diffuse angle are reflected by providing multiple microscopic prisms or micromirrors as lights which converge at a converging angle which is substantially equal to the diffuse angle, whereby the lights incident from the point light sources are caused to converge on the planar symmetric position to form an image there. As a result, since the spatial projection apparatus 100 using the light reflection member can be configured simple with a smaller number of components than that of the spatial projection apparatus 100 shown in FIG. 1.

In the spatial projection apparatus 100 described in the present embodiment, the projector 10, the image forming member 20, the light guide optical system 30, the spatial image forming region 40, the processor 60, the LiDAR sensor 70, and the output unit 80 may be integrated into one unit or may be separated into multiple units.

The projector 10 is not limited to the DLP system but may be of other systems. A projector of a liquid crystal panel (LCP) system may be used as the projector 10. With the projector of the LCP system, transmittances of light in the blue wavelength range, light in the green wavelength range, and light in the red wavelength range are controlled pixel by pixel by a liquid crystal filter (a liquid crystal panel), and the light in the blue wavelength range, the light in the green wavelength range, and the light in the red wavelength range of each pixel that pass through the liquid crystal filter are combined together to be emitted as projected light.

A projector of a liquid crystal on silicone (LCoS) system may be used as the projector 10. In the projector of the LCoS system, in place of DMD in the projector 10 of the DLP system, a display device for changing a transmittance of light (and also cutting off light) is disposed on a reflection layer in such a manner as to correspond to each pixel. As a result, the projector forms image light by reflecting light source light shined on the display device while controlling the quantity of light for each pixel and emits this image light to the outside as projected light, whereby a projected image 2a can be projected on the image forming member 20.

In the examples in which the projectors of the LCP system and the LCoS system are used as the projector 10, the lights (the light in the blue wavelength range, the light in the green wavelength range, the light in the red wavelength range) which pass through the liquid crystal filter are polarized lights having predetermined polarization directions. As a result, for example, in the present embodiment, a polarizing mirror, which is configured to reflect one of S-polarized light and P-polarized light and transmit the other, may be disposed as the beam splitter 31, and a quarter-wave plate may be disposed on an optical path between the beam splitter 31 and the retro-reflection member 32. As a result, the beam splitter 31 reflects light in a first polarizing direction which is one of S-polarized light and P-polarized light which are in lights emitted from the image forming member 20 towards the retro-reflection member 32, and the light in the first polarizing direction so reflected is transmitted through the quarter-wave plate to thereby be transformed into circular polarized light, which is then reflected by the retro-reflection member 32. The circular polarized light reflected by the retro-reflection member 32 is transmitted through the quarter-wave plate again to thereby be transformed into light in a second polarizing direction which is orthogonal to the first polarizing direction, and the light in the second polarizing direction is then transmitted through the beam splitter 31. In this way, in the case that the polarizing mirror is used as the beam splitter 31, since almost all the light reflected by the beam splitter 31 once can be transmitted through the beam splitter 31 after having been reflected by the retro-reflection member 32, the light utilization efficiency can be improved compared with the case in which the half mirror is used.

A projector of a laser scan system may be used as the projector 10. With the projector of the laser scan system, a laser beam, in which light in the blue wavelength range, light in the green wavelength range, and light in the red wavelength range are combined together as required to produce a desired color, is shined on the display device, and the display device reflects the laser beam while controlling a reflection angle in a time-sharing fashion so as for the laser beam so reflected to be shined on the image forming member 20, which is a projection target object. As this occurs, the display device shines the laser beam in such a manner as to scan the image forming member 20 two-dimensionally in a vertical direction and a horizontal direction, whereby a projected image 2a can be projected on the image forming member 20. With the projector of the laser scan system, since the projection lens for collecting light emitted from the display device can be omitted, the overall size of the projector can be reduced. In addition, with this projector, since an image can be formed by the laser beam, even in the case that an image forming member having a solid plane of a large irregularity is used, a projected image 2a of an intended clearness can be projected.

In the present embodiment, while the LiDAR sensor 70 is described as scanning the space while rotating around the two axes so as to detect the position of the detection target object in the detection target region 41 in the solid or stereoscopic space, the LiDAR sensor 70 may be configured to detect the detection target object in the detection target region 41 by being driven by an arbitrary driving mechanism so as to scan a predetermined section.

In the present embodiment, while the processor 60 is described as controlling the respective operations of the LiDAR sensor 70, the output unit 80, and the projector 10, a device having the projection unit 13 (corresponding to the projector 10 of the present embodiment) may be configured to control the LiDAR sensor 70 and the output unit 80.

An image forming member having a solid plane including a curved plane, irregularities, or the like may be used in place of the flat image forming member 20 shown in FIG. 1. As has been described by reference to FIG. 1, the optical path lengths of the light L2 and the light L3 which are guided by the light guide optical system 30 are substantially the same, and the depth position of the spatial projected image 4a as viewed from the direction A is opposite to the depth position of the projected image 2a as viewed from the direction B. That is, as shown in FIG. 3, an image forming point positioned on a far side of the projected image 2a which is curved as viewed from the direction B corresponds to an image forming point positioned on a near side of the spatial projected image 4a as viewed from the direction A. As a result, a solid or stereoscopic spatial projected image 4a can be projected on the spatial image forming region 40 by forming the image forming member into a solid plane.

While the plate-shaped or film-shaped configuration is described as being used as the image forming member 20, a fluid such as smoke or water may be used as the image forming member 20.

The image forming member 20 may be colored. As a result, the color of the spatial projected image 4a can be changed, or the tint of the spatial projected image 4a can be adjusted arbitrarily. In the case that a fluid is used as the image forming member 20, the fluid used may be colored. The coloring of the image forming member 20 may be caused to change with time in a time series fashion. As a result, various dramatic effects can be represented.

The light guide optical system 30 may use a Fresnel lens to cause the light emitted from the image forming member 20 to refocus on the spatial image forming region 40 to reform an image thereon.

In the present embodiment, while the image forming member 20 is described as being the light transmitting-type image forming member in which the projected light P1 projected on the image forming member 20 is incident from the first surface 21 and is emitted from the second surface 22 which is opposite to the first surface 21 to thereby be guided towards the light guide optical system 30 as the spatial projected light P2, a reflection-type image forming member (a projection target medium such as a projector screen, a wall surface, or the like) in which a surface from which the projected light P1 is emitted and a surface from which the spatial projected light P2 is emitted are the same may be used as the image forming member 20.

The projected image 2a which is formed on the image forming member 20 by the projected light P1 is not limited to an image formed by projected light emitted from the projector 10 but may be an optical image formed by arbitrary light source light, illumination light, LED light or laser light which is emitted from other light source apparatuses as projected light. Additionally, the projected image 2a may be formed by visible light or non-visible light (when applied, for example, to a digital watermark or the like) using an arbitrary light source.

Thus, according to the present embodiment, the detection apparatus (the spatial detection apparatus 100) includes the light guide optical system 30 for forming an image on the spatial image forming region 40 from the projected light and the LiDAR sensor 70 for detecting the detection target object in the detection target region 41 by scanning the solid or stereoscopic space in such a manner as to include the detection target region 41 of the spatial image forming region 40. As a result, the overall detection apparatus including the sensor for detecting the detection target object can be configured simple at low costs, whereby a mid-air operation can easily be detected.

With the detection apparatus including the image forming member 20 on which the projected light P1 forms an image and the light guide optical system 30 which guides the projected light P1 which forms the image on the image forming member 20 as the spatial projected lights P2, P3 to thereby reform an image on the spatial image forming region 40, a highly bright spatial projected image 4a can be displayed thereon.

With the detection apparatus in which the LiDAR sensor 70 can detect the position of the detection target object in the detection target region 41 in the solid or stereoscopic space by scanning the detection target region 41 while rotating around the two axes, the spatial scanning can be executed with the simple configuration by driving the LiDAR sensor 70 around the small number of control axes.

With the detection apparatus in which the LiDAR sensor 70 can detect the detection target object in the detection target region 41 from the side of the spatial image forming region 40, the overall apparatus including the LiDAR sensor 70 can be configured small in size.

The detection apparatus is described as including the output unit 80 which can output a response in strength corresponding to the entry depth of the detection target object in the detection target region 41 which is detected by the LiDAR sensor 70. As a result, the operator can sense the operation feeling until the detection apparatus recognizes the input operation performed on the spatial projected image 4a through the strength at the time of outputting the response.

The output unit 80 is described as being made up of the speaker or the blower machine. As a result, the operator can sense the operation feeling when the input operation is performed through the sense of hearing or touching.

The display mode of the pointer images 4a1 to 4a3 in the spatial image forming region 40 is described as being changed step by step in accordance with the entry depth of the detection target object in the detection target region 41 which is detected by the LiDAR sensor 70. As a result, the operator can sense the operation feeling until the detection apparatus recognizes the input operation performed on the spatial projected image 4a by visually confirming the change in the display mode of the pointer images 4a1 to 4a3.

The pointer images 4a1, 4a2 are configured to change the shapes in such a manner that the pointer images 4a1, 4a2 converge on the position of the detection target object as the detection target object enters deeper into the detection target region 41, whereby the operator can easily determine that the detection apparatus recognizes the input operation by visually confirming the change in shape of the pointer images 4a1, 4a2.

The pointer image 4a3 is described as changing the color as the detection target object enters deeper into the detection target region 41, whereby the operator can easily determine that the detection apparatus recognizes the input operation by visually confirming that the color of the pointer image 4a3 has changed.

The embodiment that has been described heretofore is presented as an example, and hence, there is no intention to limit the scope of the present invention by the embodiment. The novel embodiment can be carried out in other various forms, and various omissions, replacements, and modifications can be made thereto without departing from the spirit and scope the invention. These embodiments and their variations are included in the spirit and scope of the invention and are also included in scopes of inventions set forth under claims and their equivalents.

What is claimed is:

1. A detection apparatus, comprising:
   at least one processing unit;
   a light guide optical system configured to cause projected light to focus on a spatial image forming plane to form an image thereon; and
   a sensor configured to shine a laser beam over a set scanning range to detect an entry depth of a target object in a direction orthogonal to the spatial image forming plane and an entry position of the target object on the spatial image forming plane,
   wherein the processing unit executes an operation associated with the entry position when the entry depth of the target object reaches a set depth, and
   wherein the processing unit controls the light guide optical system so that a display mode of a pointer image which is displayed as being superimposed on the spatial image forming plane is caused to change step by step in accordance with the entry depth of the target object in a direction orthogonal to the image forming plane which is detected by the sensor.

2. The detection apparatus according to claim 1, wherein the sensor is provided on an identical plane to the spatial image forming plane.

3. The detection apparatus according to claim 1, comprising:
   an image forming member on which the projected light is caused to focus to form an image,
   wherein the light guide optical system guides the projected light which is caused to focus on the image forming member to form the image thereon as spatial projected light and causes the spatial projected light to refocus on the spatial image forming plane to reform an image thereon.

4. The detection apparatus according to claim 1, wherein the sensor detects the entry depth of the target object in a direction orthogonal to the spatial image forming plane and the entry position of the target object on the spatial image forming plane in a solid space including the spatial image forming plane by scanning the set scanning range while rotating around two axes.

5. The detection apparatus according to claim 1, wherein the sensor is a LiDAR sensor.

6. The detection apparatus according to claim 1, comprising:
an output unit whose output mode changes in accordance with a depth of the target object in a direction orthogonal to the image forming plane which is detected by the sensor.

7. The detection apparatus according to claim 6, wherein the output unit is a speaker or a blower machine.

8. The detection apparatus according to claim 7, wherein when the output unit is a speaker the output unit is configured to output an operation sound at a sound level corresponding to the entry depth, and
wherein when the output unit is a blower machine the output unit is configured to blow out air in a strength corresponding to the entry depth.

9. The detection apparatus according to claim 8, wherein when the output unit is a speaker the output unit is configured to output the operation sound at the sound level in at least one of a gradually increasing sound level as the entry depth increases, and a gradually decreasing sound level as the entry depth decreases, and
wherein when the output unit is a blower machine the output unit is configured to blow out air in at least one of a gradually increasing fashion in strength as the entry depth increases, and a gradually decreasing fashion in strength as the entry depth decreases.

10. The detection apparatus according to claim 1, wherein the processing unit controls the light guide optical system so that a shape of the pointer image is caused to change in such a manner as to converge on the entry position of the target object as the entry depth of the target object increases.

11. The detection apparatus according to claim 1, wherein the processing unit controls the light guide optical system so that a color of the pointer image is caused to change as the entry depth of the target object increases.

12. A detection method, comprising:
causing projected light to focus on a spatial image forming plane to form an image thereon using a light guide optical system;
shining a laser beam over a set scanning range to detect an entry depth of a target object in a direction orthogonal to the spatial image forming plane and an entry position of the target object on the spatial image forming plane using a sensor; and
executing an operation associated with the entry position using a processing unit when the entry depth of the target object reaches a set depth,
wherein the processing unit controls the light guide optical system so that a display mode of a pointer image which is displayed as being superimposed on the spatial image forming plane is caused to change step by step in accordance with the entry depth of the target object in a direction orthogonal to the image forming plane which is detected by the sensor.

13. The detection method according to claim 12, comprising:
causing the projected light to focus on an image forming member to form an image thereon,
wherein the light guide optical system guides the projected light which is caused to focus on the image forming member to form the image thereon as spatial projected light and causes the spatial projected light to refocus on the spatial image forming plane to reform an image thereon.

14. The detection method according to claim 12, wherein the sensor detects the entry depth of the target object in a direction orthogonal to the spatial image forming plane and the entry position of the target object on the spatial image forming plane in a solid space including the spatial image forming plane by scanning the set scanning range while rotating around two axes.

15. The detection method according to claim 12, wherein the processing unit controls the light guide optical system so that a shape of the pointer image is caused to change in such a manner as to converge on the entry position of the target object as the entry depth of the target object increases.

16. The detection method according to claim 12, wherein the processing unit controls the light guide optical system so that a color of the pointer image is caused to change as the entry depth of the target object increases.

17. A spatial projection apparatus, comprising:
at least one processing unit;
a light guide optical system configured to cause projected light to focus on a spatial image forming plane to form an image thereon; and
a sensor configured to shine a laser beam over a set scanning range to detect an entry depth of a target object in a direction orthogonal to the spatial image forming plane and an entry position of the target object on the spatial image forming plane,
wherein the processing unit executes an operation associated with the entry position when the entry depth of the target object reaches a set depth, and
wherein the processing unit controls the light guide optical system so that a display mode of a pointer image which is displayed as being superimposed on the spatial image forming plane is caused to change step by step in accordance with the entry depth of the target object in a direction orthogonal to the image forming plane which is detected by the sensor.

* * * * *